United States Patent
Bennett et al.

(10) Patent No.: US 9,113,042 B2
(45) Date of Patent: Aug. 18, 2015

(54) MULTI-WIRELESS DEVICE CHANNEL COMMUNICATIONS

(75) Inventors: James D. Bennett, Hroznetin (CZ); Jeyhan Karaoguz, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 987 days.

(21) Appl. No.: 12/549,556

(22) Filed: Aug. 28, 2009

(65) Prior Publication Data

US 2011/0055886 A1    Mar. 3, 2011

(51) Int. Cl.
| | |
|---|---|
| H04N 7/173 | (2011.01) |
| H04L 29/06 | (2006.01) |
| H04N 21/2347 | (2011.01) |
| H04N 21/414 | (2011.01) |
| H04N 21/63 | (2011.01) |
| H04N 21/6334 | (2011.01) |
| H04W 12/02 | (2009.01) |
| H04W 12/04 | (2009.01) |
| H04W 76/02 | (2009.01) |
| H04W 88/06 | (2009.01) |

(52) U.S. Cl.
CPC ............ *H04N 7/17318* (2013.01); *H04L 63/18* (2013.01); *H04N 21/23476* (2013.01); *H04N 21/41407* (2013.01); *H04N 21/631* (2013.01); *H04N 21/63345* (2013.01); *H04W 12/02* (2013.01); *H04W 12/04* (2013.01); *H04W 76/02* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2002/0025042 A1* | 2/2002 | Saito | 380/258 |
| 2002/0056128 A1* | 5/2002 | Makipaa | 725/98 |
| 2003/0065941 A1* | 4/2003 | Ballard et al. | 713/201 |
| 2004/0047470 A1* | 3/2004 | Candelore | 380/240 |
| 2005/0013437 A1* | 1/2005 | Ikonen et al. | 380/241 |
| 2005/0138654 A1* | 6/2005 | Minne | 725/31 |
| 2006/0117364 A1* | 6/2006 | Vitenberg | 725/111 |
| 2007/0067807 A1* | 3/2007 | O'Neil | 725/62 |
| 2007/0150930 A1* | 6/2007 | Koivisto et al. | 725/134 |

* cited by examiner

*Primary Examiner* — Cai Chen
(74) *Attorney, Agent, or Firm* — Garlick & Markison; Bruce E. Garlick

(57) ABSTRACT

A method and apparatus support delivering a video media stream to a wireless device by exchanging communication signals through a secure communications interface to establish first and second communication channels. The channels may be according to different communication protocols. A first portion of the streamed video media stream over the first communication channel is encrypted while a second portion of the video media stream over the second communication channel is not encrypted. The second portion is based on the first. In addition to encryption of only the first portion, one embodiment includes using different communication protocols for the first and second channels to further enhance secure media delivery.

30 Claims, 9 Drawing Sheets

MIMO transceiver communication network 150

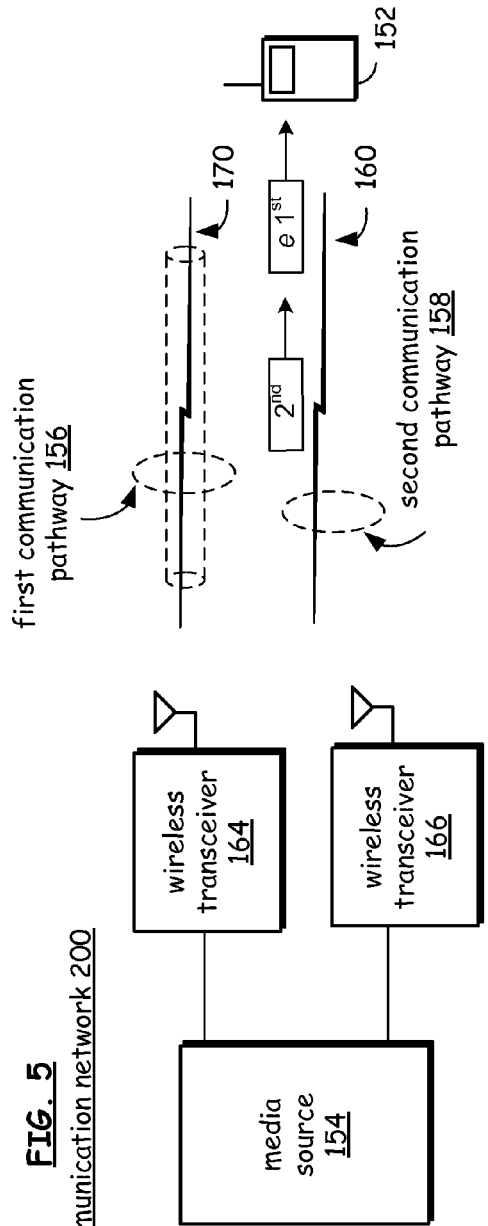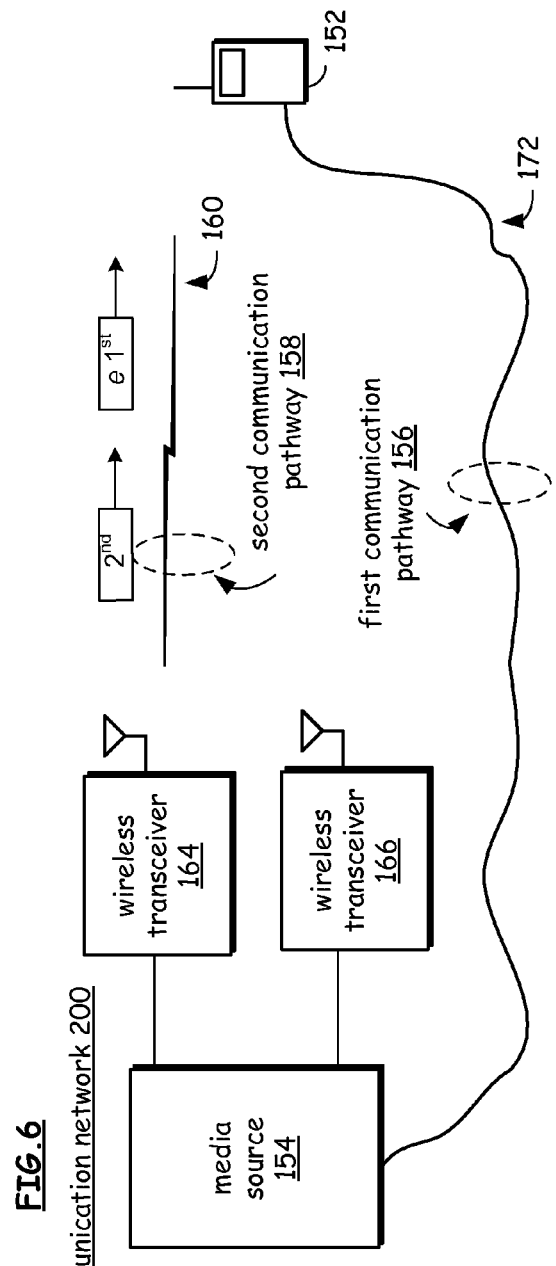

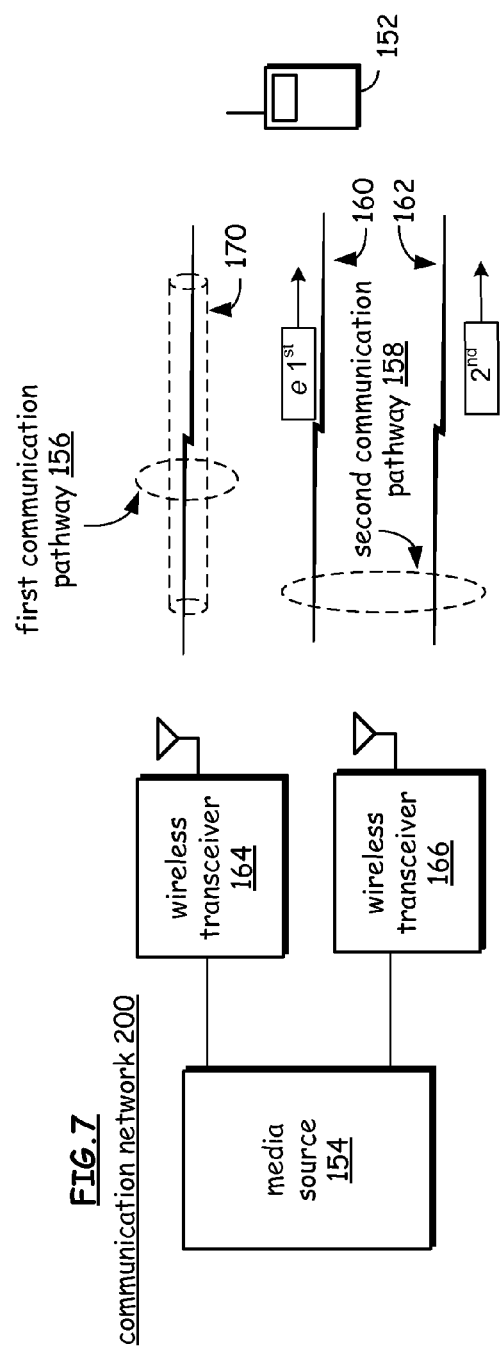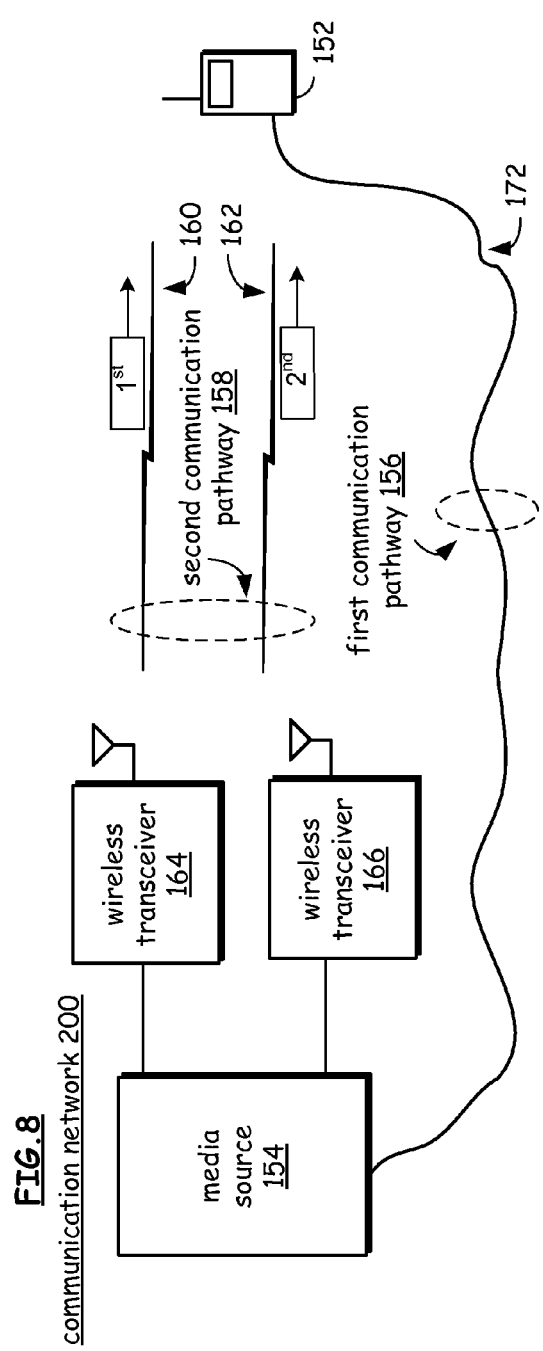

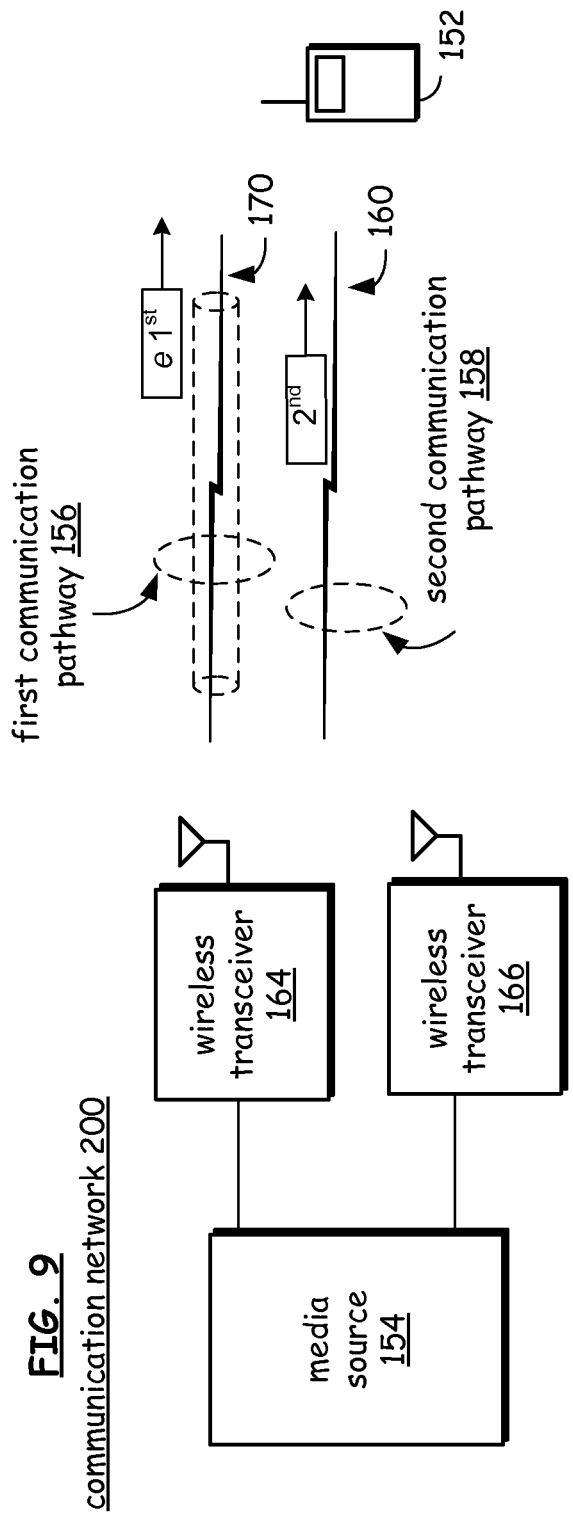

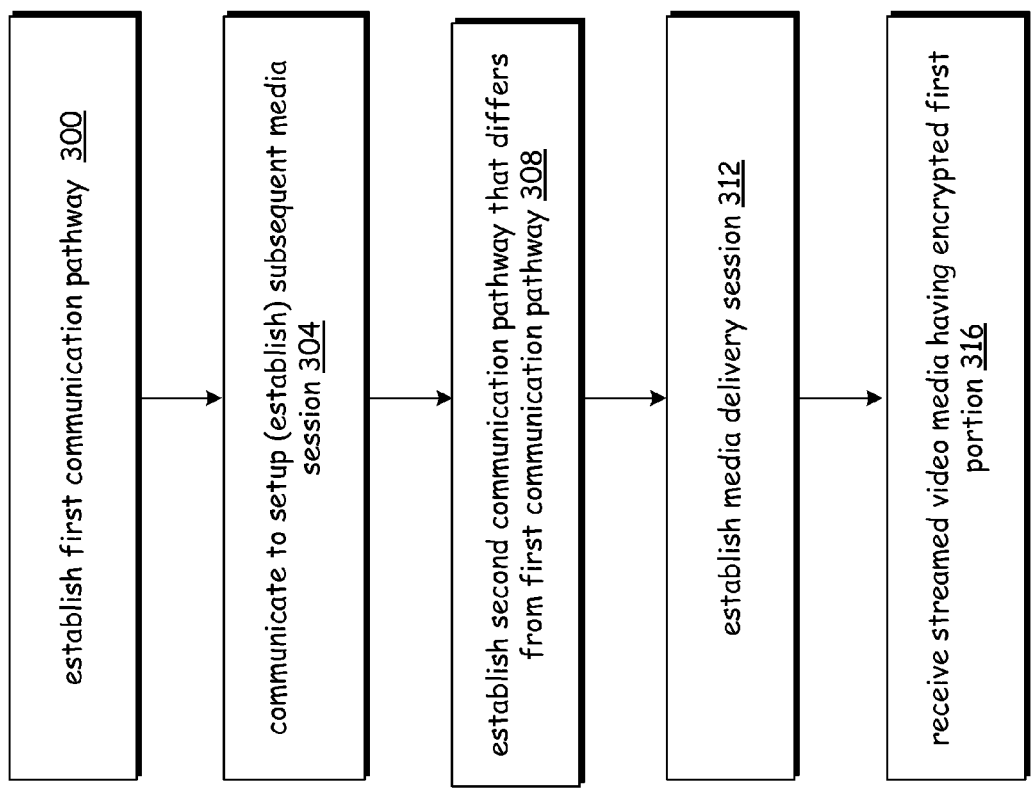

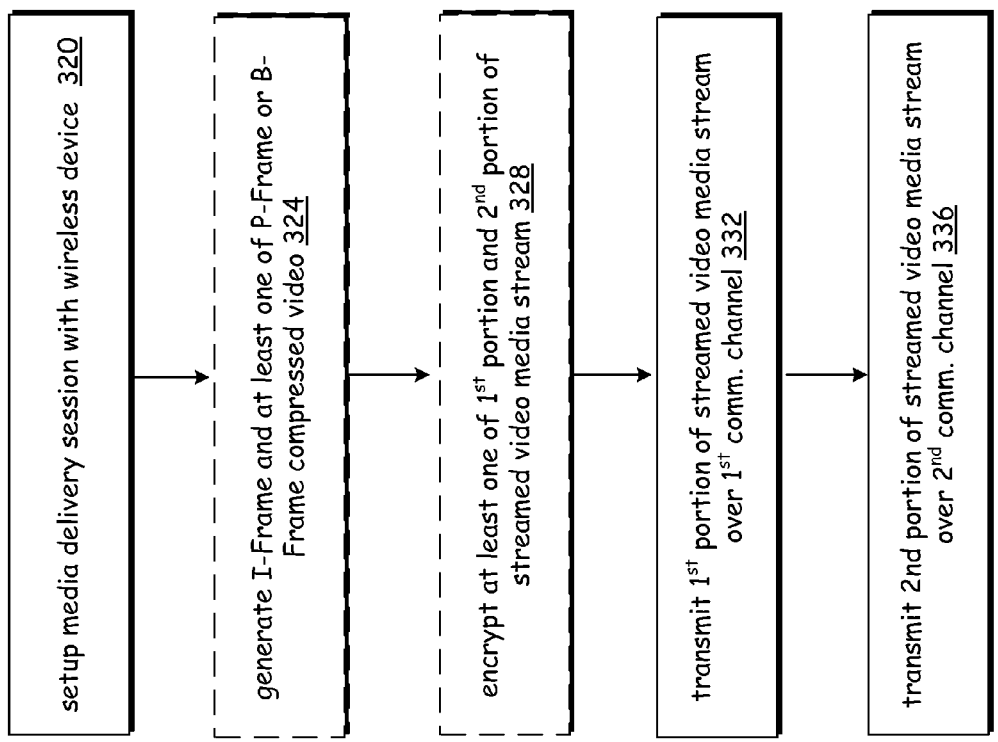

MULTI-WIRELESS DEVICE CHANNEL COMMUNICATIONS

BACKGROUND

1. Technical Field

The present invention relates to wired and wireless communications and, more particularly, to circuitry for accessing shared media.

2. Related Art

In today's world of rapidly changing devices that instantly add tools that become a significant part of everyday life, the Internet has served as a backbone for coupling networks of all types include cellular and wireless local area networks as well as wired networks to create opportunity for the continual advancement of feature based devices. As different devices are developed to operate using these networks, popular features are often limited to the particular devices. Thus, devices are often application specific having application related data formats and associated interfaces that are incompatible. Accordingly, specific functionality corresponds to specific hardware platforms that support specific protocols and interfaces.

Many communication systems, nonetheless, support wireless and wire lined communications between wireless and/or wire lined communication devices to expand global communications. Such communication systems range from national and/or international cellular telephone systems to the Internet to point-to-point in-home wireless networks.

Each type of communication system is constructed to operate to be compatible with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s).

For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (i.e., receiver and transmitter) or is connected to a radio transceiver (e.g., a station for in-home and/or in-building wireless communication networks, RF modem, etc.). The various circuit blocks of a radio transceiver jointly operate to support communications and associated functionality according to the type of communication system(s) it supports.

As wireless device capabilities have increased, new functionality is developed to enable wireless handheld devices to provide services of all type including data services, communication services, and entertainment services. The wireless communications that support such services, however, often carry proprietary or private data. Accordingly, encryption is sometimes used to protect the wireless communications to prevent capture and evaluation or copying by other devices.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which:

FIGS. 5-9 are functional block diagrams of a communication network and various alternate operations by devices within the network to support a media session to deliver video in a protected manner to a wireless handheld device according to one embodiment of the invention.

FIG. 10 is a flow chart that illustrates a method for securely receiving streamed video content over a wireless communication link according to one embodiment of the invention.

FIG. 11 is a flow chart that illustrates a method in a media source device for delivering a video media stream to a wireless device according to one embodiment of the invention.

DETAILED DESCRIPTION OF THE DRAWINGS

Figure 1:
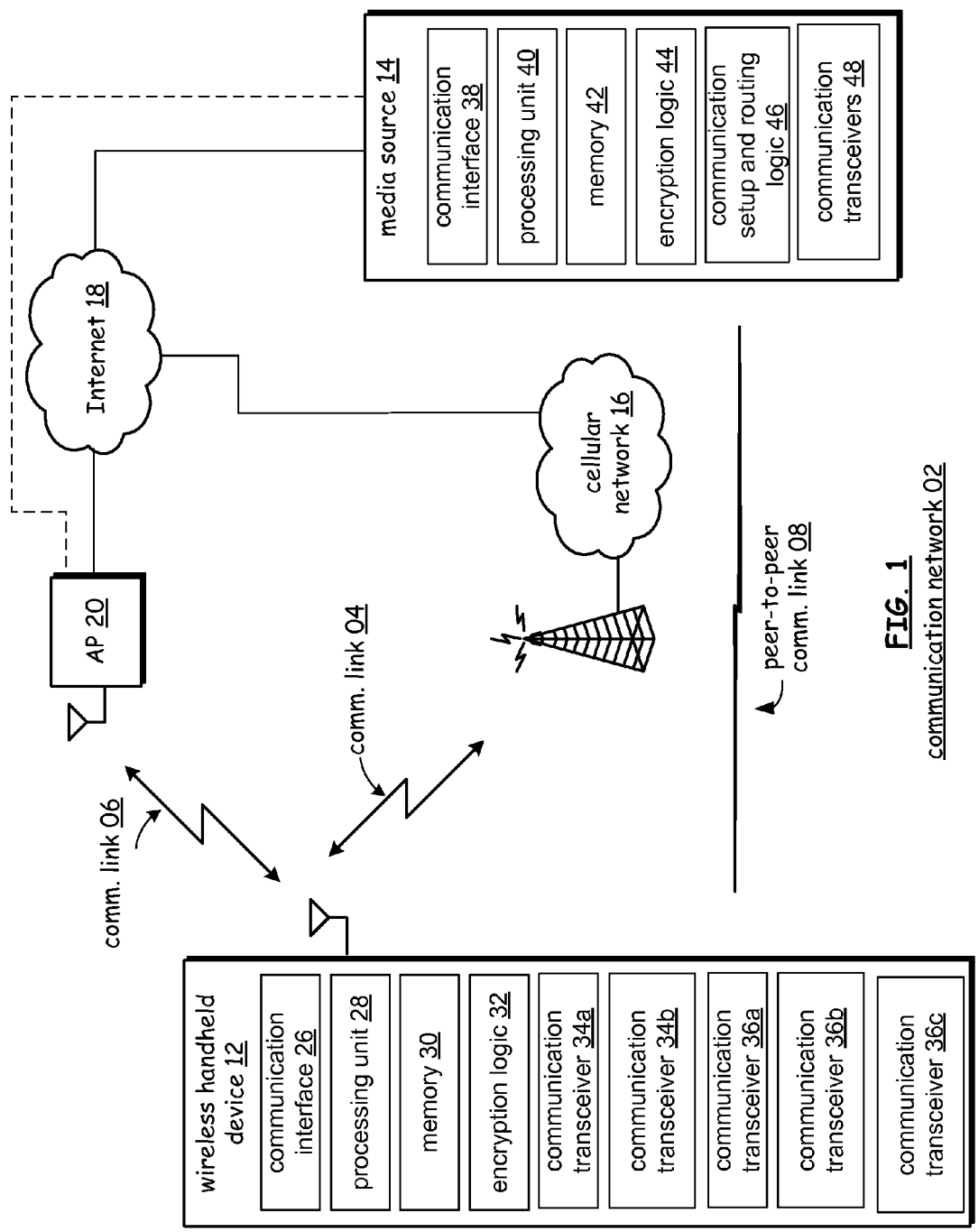
FIG. 1 is a functional block diagram illustrating a communication system that supports media access including streaming media sessions and other operations according to one embodiment of the invention.

FIG. 1 is a functional block diagram illustrating a communication system that supports media access including streaming media sessions and other operations according to one embodiment of the invention. A network 02 includes a networked group of wireless and wired devices that communicate over a plurality of communication pathways including wireless communication links 04, 06 and 08. The networked group of wireless and wired devices include wireless handheld device 12 and media source 14, as shown here in FIG. 1. These communications are supported by a vast group of interconnected networks that collectively operate as a single communication network infrastructure to connect two devices even though those two devices communicate using incompatible protocols.

The communication network infrastructure includes the elements of the public switched telephone network and other landline telephone networks, all cellular networks, and packet data networks such as the Internet. Together, these elements of the communication network infrastructure jointly operate to support calls, data sessions and data transmissions between devices of the various networks. The packet data networks may be a private or public network including corporate and governmental networks and the various versions of the Internet.

In the specific example of FIG. 1, the illustrated elements of the communication network infrastructure includes network 02 which further includes cellular network 16 and Internet 18 as well as access point (AP) 20. It should be understood that many common elements of a communication infrastructure may be included though not specifically shown. For example, AP 20 would typically connect to a modem (e.g., cable modem or DSL modem) which, in turn, is connected to other communication devices to provide access to Internet 18. Similarly, media source 14 connects to Internet 18 with similar devices. Internet 18 includes data packet switching, routing, and interfacing elements among others as is known by those of average skill in the art. Cellular network 16 represents all types of cellular networks and associated communication elements including gateway devices, base station transceivers and controllers, mobile switching centers. Thus, cellular networks 16 includes traditional networks designed to carry voice calls and new networks designed to carry data and overlay networks adapted to support data sessions on top of the voice network infrastructure.

Wireless handheld device 12 includes a first transceiver operable to communicate with AP 20 and a second transceiver operable to communicate with cellular network 16 in the described embodiment. The media source 14 and wireless handheld device 12 communicate through a communication pathway that includes at least one of wireless communication link 04 through cellular network 16 and Internet 18 or wireless communication link 06 through AP 20. Media source 18 may connect to AP 20 directly through a local area network or through Internet 18 as shown by in FIG. 1. Communication link 04 complies with a cellular communication protocol such as, but not limited to, Code Division Multiple Access (CDMA), Global System for Mobile communications (GSM), Time Division Multiple Access (TDMA), etc.

Communication link 06 complies with a protocol or standard for wireless local area networks (WLANs) such as any of the IEEE 802.11 based protocols. These protocols and standards define signal formats, communication channel formats, methods of transmission, data formats, etc. Generally, cellular protocols and standards support relatively long distance wireless communications for mobile devices in relation to WLANs and personal area networks (PANs). Thus, the cellular protocols support communications for cellular phones in moving cars by providing for an expansive network of cell areas that communicate to hand off a call from one cell area to another for the moving mobile device. WLANs do not include the sophisticated architecture and protocols for to support the type of mobility found in cellular networks and thus are often substantially less expensive to use. Additionally, a typical performance tradeoff between the two networks is that cellular networks provide greater mobility while WLAN standards and protocols typically support higher data rate communications for wireless devices that are relatively confined to an area near the access point such as AP 20.

Communication link 08, as may be seen in FIG. 1, is one that supports peer-to-peer communications. Accordingly, transceivers 36a-36c are operable to communicate directly with media source 14 without going through a plurality of networks and/or network elements. In one embodiment, communication transceiver 36a is a transceiver that communicates according to a PAN protocol such as Bluetooth™ while communication transceiver 36b is a transceiver that communicates according to a protocol for infrared communications such IrDA. Communication transceiver 36c is one that supports wired or "tethered" communications according to a wired communication protocol. The wired communications may be according to any protocol for wired communications including Universal Serial Bus (USB) and IEEE 1384 (FireWire™) as well as other proprietary protocols that support wired communications. Communication link 08, therefore, is a peer-to-peer communication link through any one of transceivers 36a-36c. In an alternate embodiment, communication link may also be one that is through a WLAN transceiver using a WLAN peer-to-peer communication link according to the WLAN protocol.

As may further be seen, wireless handheld device 12 includes a communication interface 26. Communication interface 26 comprises one or more interface elements including ports, connectors, display elements, sound devices and circuitry, data entry devices, etc., to allow a person to communicate through wireless handheld device 12 as well as to allow other devices to couple wirelessly or by wire to wireless handheld device 12. Wireless handheld device 12 further includes a processing unit 28 that executes logic defined by computer instructions stored in memory 30 to provide the operational functionality of wireless handheld device 12.

Wireless handheld device 12 further includes encryption logic 32 that support encryption operations according to the various embodiments of the invention to establish communications that are entirely encrypted (e.g., so called communication "tunnels") and communications in which only a portion of a signal or communication is encrypted. Generally, establishing encryption comprises any known method that supports exchange of encryption information or parameters to support encrypted communications.

Finally, wireless handheld device 12 includes a plurality of communication transceivers shown including transceivers 34a and 34b as well as transceivers 36a-36c. Transceiver 34a is a radio transceiver that operates according to a cellular protocol while transceiver 34b operates according to a WLAN protocol (such as IEEE 802.11) to support communications over communication links 22 and 24, respectively. Transceivers 36a and 36b are operable to wirelessly communicate over any one of a cellular communication link, a WLAN communication link, a Bluetooth or other personal area network communication link, an infrared communication links such the Infrared Data Association (IrDA) protocol communications, etc. Transceiver 36c is operable to communicate over a tethered (wired) communication link.

Media source 14 includes a communication interface 38, a processing unit 40, a memory 42, encryption logic 44, communication setup and routing logic 46 and a at least one communication transceiver block 48. Communication interface 38, processing unit 40 and memory 42 provide functionality similar to the corresponding elements of wireless handheld device 12 though the functionality is varied according to design requirements for media source 14. Encryption logic 44 supports encryption operations as described in the various embodiments of the invention. Communication setup and routing logic 46 is operable to determine a communication path and associated communication link to be used for transmission of signals between media source 14 and wireless handheld device 12 and to exchange communication signals with one or more remote devices including wireless handheld device 12.

In one embodiment, for example, a first communication pathway is established between wireless handheld device 12 and media source 14 to setup a media delivery session. A second communication pathway is then set up to support the media delivery session. Within the second communication pathway, one or more communication channels may be established to deliver streaming media. In yet another embodiment, a third communication pathway is established for carrying the second communication channel of the media session. Generally, reference to a pathway herein suggests that the communication link has an associated protocol for the transmissions. Reference to different pathway means, in this specification and in the claims, that the communications are by communication links using different communication protocols. Thus, first and second communication pathways are, by definition, communication links that utilize different communication protocols. In references herein to first and second communication links, however, there is no suggestion as to protocol relationships. Thus, in the specific examples, the first and second communication links of a second communication pathway, for example, include communications utilizing the same communication protocol as well as communications using different communication protocols. In either case, however, the communication protocol is different than the protocol used in the first communication pathway (because they are associated with different communication pathways.

Communication setup and routing logic 46 is operable to establish such operations and communications with wireless handheld device 12. Additionally, in one embodiment, a first portion of a video signal is transmitted on the first communication channel while a second portion of a video signal is transmitted on the second communication channel. Thus, a sniffing device tuned into one channel would only receive parts of a video signal and would not be able to reconstruct the video signal. Accordingly, logic 46 is operable to setup such communications. Finally, communication transceiver block 48 includes a plurality of transceivers to support multiple communication pathways using different protocols. In one specific embodiment, communication transceivers 48 includes at least two transceivers to support at least two communication pathways between it and wireless handheld device 12 using different communication protocols.

In one specific embodiment, the first communication channel carries I-Frame compressed video frames while the second communication channel carries at least one of P-Frame or B-Frame compressed video frames. P-Frame and B-Frame compressed video frames generally reflect incremental or relative changes to the I-Frame compressed video frames. Moreover, one aspect of the embodiment of the invention is that the I-Frame compressed video frames are encrypted while the P-Frames and/or B-Frames are not encrypted according to encryption parameters established for communications between wireless handheld device 12 and media source 14.

Figure 2:
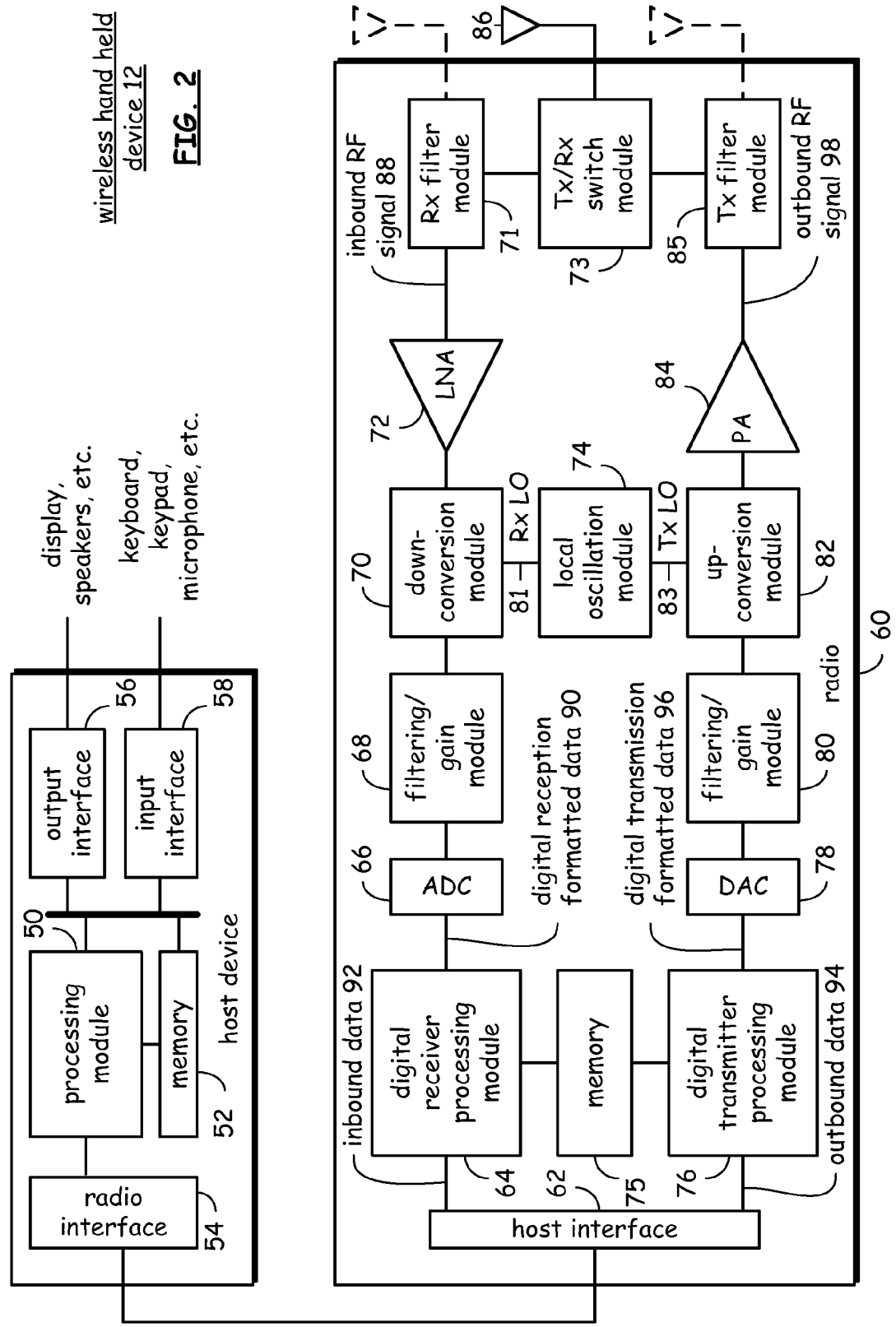
FIG. 2 is a schematic block diagram illustrating a wireless communication host device such as wireless handheld device 12 and an associated radio such as radio 60.

FIG. 2 is a schematic block diagram illustrating a wireless communication host device such as wireless handheld device 12 and an associated radio such as radio 60. For cellular telephone hosts, radio 60 is a built-in component. For personal digital assistants hosts, laptop hosts, and/or personal computer hosts, the radio 60 may be built-in or an externally coupled component.

As illustrated, wireless handheld device 12 includes a processing module 50, a memory 52, a radio interface 54, an input interface 58 and an output interface 56. Processing module 50 and memory 52 execute the corresponding instructions that are typically done by the host device (wireless handheld device 12). For example, for a cellular telephone host device, processing module 50 performs the corresponding communication functions in accordance with a particular cellular telephone standard.

Radio interface 54 allows data to be received from and sent to radio 60. For data received from radio 60 (e.g., inbound data), radio interface 54 provides the data to processing module 50 for further processing and/or routing to output interface 56. Output interface 56 provides connectivity to an output device such as a display, monitor, speakers, etc., such that the received data may be displayed. Radio interface 54 also provides data from processing module 50 to radio 60. Processing module 50 may receive the outbound data from an input device such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 is shared by the transmit and receive paths as regulated by the Tx/Rx switch module 73. The antenna implementation will depend on the particular standard to which the wireless communication device is compliant.

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and modulation. Digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein. Functional modules described herein this specification may be further included in addition to the modules and circuits shown here in FIG. 2 and also in FIG. 3 or may be included as a part of modules and circuits shown here in FIG. 2 and also in FIG. 3. For example, memory 75 may include computer instructions that define operations according to the various embodiments of the invention.

In operation, radio 60 receives outbound data 94 from wireless handheld device 12 via host interface 62. Host interface 62 routes outbound data 94 to digital transmitter processing module 76, which processes outbound data 94 in accordance with a particular wireless communication standard or protocol (e.g., IEEE 802.11(a), IEEE 802.11b, Bluetooth, etc.) to produce digital transmission formatted data 96. Digital transmission formatted data 96 will be a digital baseband signal or a digital low IF signal, where the low IF typically will be in the frequency range of one hundred kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal 98, which is filtered by transmitter filter module 85. The antenna 86 transmits outbound RF signal 98 to a targeted device such as a base station, an access point and/or another wireless communication device.

Radio 60 also receives an inbound RF signal 88 via antenna 86, which was transmitted by a base station, an access point, or another wireless communication device. The antenna 86 provides inbound RF signal 88 to receiver filter module 71 via Tx/Rx switch module 73, where Rx filter module 71 bandpass filters inbound RF signal 88. The Rx filter module 71 provides the filtered RF signal to low noise amplifier 72, which amplifies inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the wireless handheld device 12 via radio interface 54.

As one of average skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of the host device and digital receiver processing module 64 and digital transmitter processing module 76 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76. As will be described, it is important that accurate oscillation signals are provided to mixers and conversion modules. A source of oscillation error is noise coupled into oscillation circuitry through integrated circuitry biasing circuitry. One embodiment of the present invention reduces the noise by providing a selectable pole low pass filter in current mirror devices formed within the one or more integrated circuits.

Local oscillation module 74 includes circuitry for adjusting an output frequency of a local oscillation signal provided by module 74. Local oscillation module 74 receives a frequency correction input that it uses to adjust an output local oscillation signal to produce a frequency corrected local oscillation signal output. While local oscillation module 74, up-conversion module 82 and down-conversion module 70 are implemented to perform direct conversion between baseband and RF, it is understood that the principles herein may also be applied readily to systems that implement an intermediate frequency conversion step at a low intermediate frequency.

Figure 3:
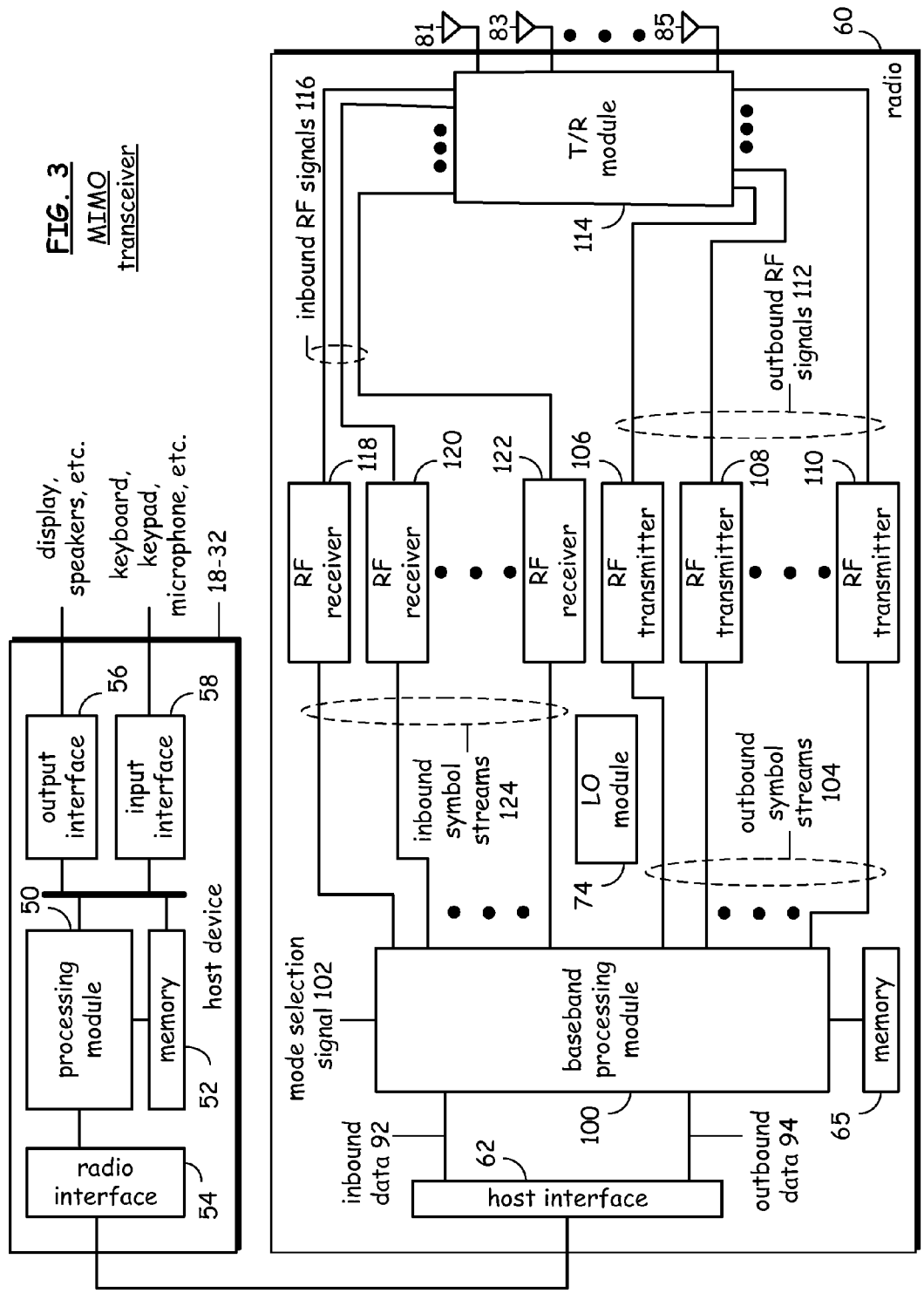
FIG. 3 is a schematic block diagram illustrating a wireless communication device that includes the same basic transceiver modules and circuits of FIG. 2 but is configured to support communications over a plurality of channels simultaneously.

FIG. 3 is a schematic block diagram illustrating a wireless communication device that includes the same basic transceiver modules and circuits of FIG. 2 but is configured to support communications over a plurality of channels simultaneously. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode selection signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode selection signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates 2, 3 or 4 antennas, the baseband processing module 100 will produce 2, 3 or 4 outbound symbol streams 104 from the outbound data 94.

Depending on the number of outbound symbol streams 104 produced by the baseband processing module 100, a corresponding number of the RF transmitters 106-110 will be enabled to convert the outbound symbol streams 104 into outbound RF signals 112. In general, each of the RF transmitters 106-110 includes a digital filter and upsampling module, a digital-to-analog conversion module, an analog filter module, a frequency up conversion module, a power amplifier, and a radio frequency band-pass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

Figure 4:
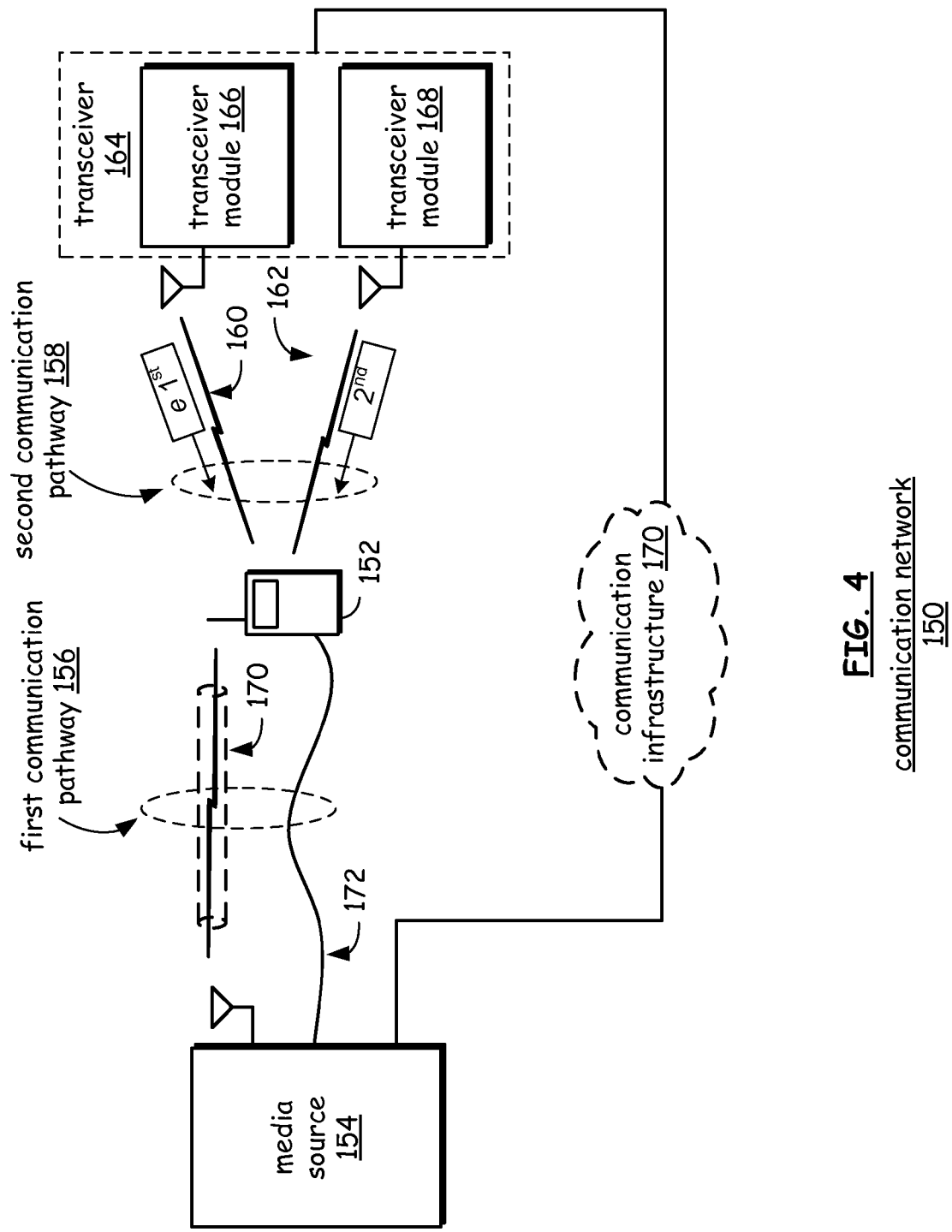
FIG. 4 is a communication network that includes a wireless handheld device that is operable to communicate over a plurality of communication channels in a secure manner receive video in an established media session according to one embodiment of the invention.

FIG. 4 is a communication network that includes a wireless handheld device that is operable to communicate over a plurality of communication channels in a secure manner to receive video in an established media session according to one embodiment of the invention. The communication network 150 includes wireless handheld device 152 which communicates with a remote media source 154 to establish a media session and then to receive and process streaming video. Wireless handheld device 152 comprises a communications interface operable to communicate with another device via a plurality of networks including at least one wireless network, memory and processing circuitry coupled to the communications interface and the memory similar to that described in relation to FIGS. 2 and 3 to support the disclosed functionality.

Wireless handheld device 152 is operable to establish a first communication pathway 156 with remote media source 154 to set up a subsequent delivery of a video stream over a plurality of communication channels and/or to establish a media session for delivery of video content. Part of setting up subsequent delivery of the video stream includes, in one embodiment, exchanging communication signals for establishing a second communication pathway 158. In one embodiment, the second communication pathway includes first and second communication channels 160 and 162.

Generally, references herein to first and second communication pathways mean that the communication channels of the first communication pathway comply with a communication standard or protocol that is different from communication channels of the second communication pathway. Thus, communications to set up a media session utilize communication standards or protocols that are different than the communication channels used to deliver streaming media. Within a communication pathway, as referenced herein, communication channels may use the same or different communication protocols or standards. There is no implication that the channels of a common communication pathway are based on the same or different protocols or standards.

Communication channels 160 and 162 may be transmitted from a single transceiver, two transceivers in a common or single device, or from two separate devices. Here, in FIG. 4, a transceiver 164 (e.g., a base station or access point) having two wireless transceiver modules 166 and 168 is shown. The two transceiver modules 166 and 168 may, alternately, be internal and a part of media source 154. For example, one might an internal transceiver that supports communications according to a personal area network protocol while the other is an access point or base station transceiver. In the case where both are external, one may be an access point while the other is a base station. The aspect reflected in FIG. 4 is that media source uses two wireless transceivers for delivering video signals in a media session.

To illustrate, communication signals received over communication channel 160 are transmitted by wireless transceiver 166 which can include a base station transceiver of a cellular network that transmits from a remote cellular tower while communication signals received over communication channel 162 are transmitted by wireless transmitter 168 which can include an access point of a wireless local area network. Alternatively, wireless transceivers 166 and 168 can include two transceivers of a common device such as the MIMO transceiver of FIG. 3 that transmit according to the similar communication protocols using different communication channels separated in time or frequency. If both transceiver modules are part of a transceiver 164, as suggested by the dashed lines for transceiver 164, then transceiver 164 is a MIMO transceiver and transceiver modules 166 and 168 are different radio transmitters of transceiver 164.

In yet another embodiment, both transceivers may be part of the same device but be distinct transceivers that communicate according to different protocols. For example, transceiver 166 may be one that supports one of a WiMax wireless protocol, an I.E.E.E. 802.11 based wireless protocol, a Bluetooth wireless protocol, or an infrared wireless communication protocol (e.g., an IrDA infrared communication protocol). Transceiver 168, therefore, may be one that supports a different one of the WiMax wireless protocol, the I.E.E.E. 802.11 based wireless protocol, the Bluetooth wireless protocol (or any other personal area network protocol), or the infrared wireless communication protocol. Referring back to FIG. 1, for example, a plurality of transceivers may be a part of a single device.

Media source 154, in one embodiment, transmits video signals (compressed video frames) by way of communication infrastructure 170 which includes a packet data network and associated supporting hardware elements as described in relation to FIG. 1. Accordingly, wireless handheld device 152 is operable to receive a first portion of a video signal over a first communication channel 160 of the second communication pathway 158. Wireless handheld device 152 is further operable to receive a second portion of the video signal over a second communication channel 162 of the second communication pathway 158. Because the video signal is being transmitted over a plurality of communication channels, an eavesdropping device that successfully intercepts communication signals on one communication channel (e.g., the second communication channel) that contain the video signal would not allow the construction of the video unless the eavesdropping equipment successfully intercepted, at the same time, the communication signals transmitted over the first communication channel. Thus, even if the first and second communication channels correspond with the same communication protocol and are only separated by physical layer characteristics (e.g, time or frequency), the difficulty of intercepting both communication channels in a manner that allows reconstruction of the video signal is low.

According to another embodiment of the invention, however, the first communication channel comports with a first communication protocol and the second communication channel comports with a second communication protocol that is different from the first communication protocol. Accordingly, security of the transmission of the video signal is further enhanced by the video signal being transmitted over a plurality of communication channels using a plurality of communication protocols. If, for example, the first communication channel is transmitted according to a WLAN protocol (e.g., 802.11(n)) while the second communication channel is transmitted according to a cellular protocol (e.g., C.D.M.A), eavesdropping equipment would have to be able to intercept both 802.11(n) signals and C.D.M.A. signals to capture a video signal that can be reconstructed.

According to yet another embodiment of the invention, transmissions of the video signals include transmitting compressed video frames in the second communication channel 162 that are based upon compressed video frames transmitted in the first communication channel 160. Accordingly, secure of the video content is further enhanced by the fact that if the compressed video frames transmitted on the second communication channel 162 are successfully intercepted, the content is valueless since the video content is based upon the video content transmitted in the compressed video frames over the first communication channel 160. For example, in one embodiment, the video content of the second communication channel 162 reflects changes in video content from a prior frame transmitted in the first communication channel 162. In one specific example, so called P-Frames or B-Frames of compressed video are transmitted on the second communication channel 162 while so called I-Frames of compressed video are transmitted on the first communication channel 160.

To further enhance security of the transmission of the video in an established media session, one embodiment of the invention further includes encrypting communication signals transmitted on at least one of the first and second communication channels. Thus, for example, if the I-Frame compressed video frames transmitted on the first communication channel 160 are encrypted, then successful interception of transmissions over the first and second communication channels still would not allow reconstruction of the video signal unless the I-Frame compressed video frames can successfully be decrypted prior to processing and reconstructing the video signal.

This operation is indicated in FIG. 4 by the first portion of a video signal being transmitted on communication channel 160 is labeled "e $1^{st}$" to represent an encrypted first portion of the video signal. The second portion of the video signal transmitted on the second communication channel 162 is labeled as "$2^{nd}$" to represent an unencrypted second portion of the video signal. It should be noted that, in one embodiment, the second video portion may also be encrypted. Because the video signal cannot be reconstructed without successfully capturing and decrypting the first portion, however, there is less need to encrypt the second portion of the video signal transmitted over the second communication channel 162. Accordingly, less processing resources are required to transmit and to receive the unencrypted $2^{nd}$ portions of the video signal which also supports, therefore, faster transmission times.

The processing circuitry of wireless handheld device 152, in combination with the communications interface and memory (as described in relation to FIG. 1), is further operable to decrypt at least one of the first and second portions of the video signal using encryption parameters established in the first communication pathway 156. Generally, subsequent references herein to the operations of a particular device should be understood to include operations by a processor or logic within the device. Thus, wireless handheld device 152 is operable to decrypt at least one of the first and second portions of the video signal using encryption parameters established in the first communication pathway 156. Generally, one requirement for the first communication pathway is that the first communication pathway is one that provides strong encryption or security as it is being used to setup a subsequent communication (e.g., media session) including the setting up of encryption parameters for the media session.

Here, in FIG. 4, first communication pathway 156 includes at least one of a wireless communication tunnel 170 or a wired transmission medium 172. Wireless communication tunnel 170 can include any known tunneling protocol. For example, the "tunnel", which comprises strongly encrypted communications, may be one that is established through a Bluetooth simple pairing process, one that uses pre-shared encryption keys to establish the tunnel according to IEEE 802.11 protocols, or any other known approach for establishing encrypted communications through a so called "tunnel". A tunnel may initially be established using assigned pre-shared encrypted keys wherein, after established, a known procedure for encryption key exchange may be utilized to establish new pre-shared encryption keys for subsequent secured communications between media source 154 and wireless handheld device 152.

Referring again to the transmissions of the first and second video portions over first and second communication channels 160 and 162, in the embodiment in which the first portion is encrypted as shown in FIG. 4, wireless handheld device 152 decrypts the first portion of the video signal and does not decrypt the second portion of the video signal and then combines the first and second portions and reconstructs the video signal. The process of combining I-Frame with at least one of P-Frame and B-Frame compressed video is known by one of average skill in the art. In an embodiment in which the first and second portions transmitted over the first and second communication channels 160 and 162 are encrypted, wireless handheld device 152 decrypts both portions of the video signal received, for example, in a media session, to reconstruct the video and play it for the user of wireless handheld device 152. In the described embodiment of FIG. 4, wireless handheld device 152 and media source 154 communicate over wireless communication tunnel 170 to perform a Bluetooth simple pairing procedure to establish an encryption key for encrypting at least one of the first and second portions of the video signal transmitted over one of first and second communication channels of the second communication pathway.

FIGS. 5-9 are functional block diagrams of a communication network and various alternate operations by devices within the network to support a media session to deliver video in a protected manner to a wireless handheld device according to one embodiment of the invention. The various devices are as described in relation to previous figures. For simplicity, elements of various networks of the communications infrastructure are not shown here but should be understand to be present to support the described operations.

Generally, each of the operational aspects of the embodiments of FIGS. 5-9 comprise wireless handheld device 152 communicating with media source 154 to setup and then engage in a media session. Media source 154 communicates with wireless handheld device 152 through a plurality of pathways and communication links of the plurality of pathways to securely deliver video signals in a media session. Media source 154 may use one or more wireless transceivers such as wireless transceivers 166 and 168 as well as a wired communication link to support such operations described herein.

Referring to FIG. 5, media source 154 and wireless handheld device 152 communicate over first communication pathway 156 comprising communication link 170 to setup a subsequent media session so that media source 154 can transmit video signals to wireless handheld device 152. First communication pathway 152 comprises a secure communication 170 in which all communications are strongly encrypted. In one particular embodiment, communication link 170 comprises a secure wireless tunnel that is established using a previously determined encryption key or, alternatively, one that is established through a Bluetooth Simple Pairing procedure. Setup of the media session comprises at least one of identifying media content to be transmitted to wireless handheld device 152, identifying account information, identifying transmission parameters, and identifying encryption parameters for subsequent use for encrypted portions of video signals that are to be transmitted over the second communication pathway 158. In this embodiment, an encrypted first portion of a video signal and an unencrypted second portion are both transmitted over communication link 160 of second communication pathway 158. Moreover, the unencrypted second portion of the video signal is based upon the encrypted first portion.

The encrypted first portion is encrypted using encryption parameters that correspond to encryption parameters defined within the setup communications over the first communication pathway 156. In one embodiment, the encrypted first portion is an encrypted I-Frame of compressed video frames while the second portion is an un-encrypted P-Frame (or B-Frame) of compressed video frames. Finally, as described before, first communication pathway 156 comprises communications of a different protocol than those of second communication pathway 158.

Referring to FIG. 6, first communication pathway 156 comprises a communication link 172 which is a wired communication link. The wired communication link is used between media source 154 and wireless handheld device 152 to setup subsequent media delivery sessions including identifying encryption parameters. The media session and delivery of video content over second communication pathway 158 comprising communication link 160 is the same as described in relation to FIG. 5.

In this embodiment, an encrypted first portion of a video signal and an unencrypted second portion are both transmitted over communication link 160 and communication link 162, respectively, of second communication pathway 158. Moreover, the unencrypted second portion of the video signal is based upon the encrypted first portion. The encrypted first portion is encrypted using encryption parameters that correspond to encryption parameters defined within the setup communications over the first communication pathway 156. Finally, as described before, first communication pathway 156 comprises communications of a different protocol than those of second communication pathway 158.

Referring to FIG. 7, media source 154 and wireless handheld device 152 communicate over first communication pathway 156 comprising communication link 170 to setup a subsequent media session so that media source 154 can transmit video signals to wireless handheld device 152. First communication pathway 152 comprises a secure communication 170 in which all communications are strongly encrypted. In one particular embodiment, communication link 170 comprises a secure wireless tunnel that is established using a previously determined encryption key or, alternatively, one that is established through a Bluetooth Simple Pairing procedure. Setup of the media session comprises at least one of identifying media content to be transmitted to wireless handheld device 152, identifying account information, identifying transmission parameters, and identifying encryption parameters for subsequent use encrypted portions of video signals that are to be transmitted over the second communication pathway 158. Setup of the media session can also include defining or identifying communication links 160 and 162 of second communication pathway 158 for the media session (delivery of video).

In this embodiment, an encrypted first portion of a video signal and an unencrypted second portion are both transmitted over communication link 160 and communication link 162, respectively, of second communication pathway 158. Moreover, the unencrypted second portion of the video signal is based upon the encrypted first portion. The encrypted first portion is encrypted using encryption parameters that correspond to encryption parameters defined within the setup communications over the first communication pathway 156. Finally, as described before, first communication pathway 156 comprises communications of a different protocol than those of second communication pathway 158.

Operations described in relation to FIG. 7 may be varied. In one embodiment, the first channel of the second communication pathway may be used to carry data (encrypted or unencrypted) while the second channel is used to carry control data or meta data.

FIG. 8 includes a first communication pathway 156 comprises a communication link 172 which is a wired communication link. The wired communication link is used between media source 154 and wireless handheld device 152 to setup subsequent media delivery sessions including identifying encryption parameters. The wired communications may be according to any protocol for wired communications including Universal Serial Bus (USB) and IEEE 1384 (FireWire) as well as proprietary protocol wired communications. The media session and delivery of video content over second communication pathway 158 comprising communication link 160

Setup of the media session comprises at least one of identifying media content to be transmitted to wireless handheld device 152, identifying account information, identifying transmission parameters, and identifying encryption parameters for subsequent use encrypted portions of video signals that are to be transmitted over the second communication pathway 158. Setup of the media session can also include defining or identifying communication links 160 and 162 of second communication pathway 158 for the media session (delivery of video).

In the described embodiment, communication links 160 and 162 are both different from communication link 172 of first communication pathway 156 as well as being different from each other. Here, neither the first nor the second portions of the video signal are encrypted. The diversity of communication protocols is relied upon to provide secure delivery of the video signals. It should be understood that this described embodiment in which communication links 160 and 162 use different communication protocols and neither the first or the second video portions are encrypted may be used in conjunction with a wireless first communication pathway as described in relation to FIG. 7 as well.

FIG. 9 shows yet another embodiment in which the first communication pathway comprises a secure wireless tunnel as described in relation to FIGS. 5 and 7 which is used to setup a subsequent media session but is also used to deliver the first portion of the video signals. The unencrypted second portion of the video signal is delivered over communication link 160 of the second communication pathway 158. Thus, this embodiment takes advantage of the secure tunnel to protect the first portion of the video signal to prevent an eavesdropping device from being able to reconstruct a video signal even if the second portion of the video signal is successfully intercepted. In some embodiments of the invention that correspond to FIGS. 5-8, the communications over the first communication pathway are terminated and the communication link is torn down prior to the communications over the second communication pathway for delivery of the video in the media session. Here, however, even if the setup communications are terminated, the first communication pathway is maintained to deliver the first video portion to wireless handheld device 152.

Here, in FIG. 9 as well as the embodiments of the previous figures, it should be understood that the media source and the media device that is to receive the streaming media, set up at least one communication channel for receiving the streamed video media stream that comprises compressed video frames. Typically, two or more communication channels will be used to carry the streamed video media stream. In all embodiments, at least two different protocols or communication standards are used for setting up the media session and for delivering the streamed video media stream over one or more communication channels. Thus, based upon setup communications, at least one communication channel is specified during the setup of the media session for carrying the streamed video media stream which use a protocol or standard that is different from the communication protocol or standard used to setup the media delivery session. In addition to selecting communication channels and associated protocols or standards during the setup of the media session, setup includes establishing an encryption key and, in one embodiment, identification of what portions of video content are to be encrypted and what portions will not be encrypted.

FIG. 10 is a flow chart illustrating a method for securely delivering streamed video content according to one embodiment of the invention. Generally, the method of FIG. 11 is a method of operating a wireless device to receive streamed video media stream from a media source device. The method includes the wireless device establishing a first communication pathway with the media source device (300). In the described embodiment, the first communication pathway includes a wireless communication path that is created with strong encryption to secure the communication link and to protect privacy of the encryption parameters.

The wireless device interacts with the media source device via the first wireless communication path to establish a media delivery session (304). These communications or interactions include the exchange of encryption parameters to establish an encryption key. In one embodiment, the encryption key includes a public portion and a private key portion. Exchange of encryption parameters to establish an encryption key comprises at least one of receiving an encryption key parameter from the remote device, transmitting an encryption key parameter to the remote device, engaging in a key exchange to replace an original encryption key with a new encryption key, or engaging in a simple pairing procedure (e.g., a Bluetooth Simple Pairing procedure) according to an established simple pairing procedure for exchanging encryption key parameters.

Thereafter, the method includes the wireless device establishing a second communication pathway with the media source device, the second communication pathway including a second wireless communication pathway that differs from the first communication pathway (306). The first and second communication pathways include communication signals transmitted using different wireless communication protocol standards. In one embodiment, the first communication pathway is a wireless communication pathway according to a communication protocol for cellular devices and corresponding network elements. Here, the second communication pathway is a wireless communication pathway according to one of a WiMax wireless protocol, an I.E.E.E. 802.11 based wireless protocol, a Bluetooth wireless protocol, or an infrared wireless communication protocol. Generally, however, any of these or a cellular communication protocol may be used for any of the communication pathways so long as two pathways comply with different communication protocols relative to each other.

Once the second communication pathway is established, the method includes establishing a media delivery session to receive streamed video media stream (312) and receiving streamed video media having an encrypted first portion (316). This step includes receiving the encrypted first portion and decrypting the encrypted first portion using the encryption key for an encrypted first portion of the video media stream identified in the setup communications (316). In one embodiment, the encrypted first portion of the video media stream is transmitted over a first communication channel and a second portion of the video media stream is transmitted over a second communication channel. Furthermore, content of the second portion is based upon the first portion.

FIG. 11 is a flow chart that illustrates a method in a media source device for delivering a video media stream to a wireless device according to one embodiment of the invention. The method includes setting up a media delivery session by exchanging communication signals through a secure communications interface with the wireless device to establish first and second communication channels (320). In one embodiment, the first and second communication channels are for carrying communications according to first and second communication protocols, respectively, that are different in relation to each other.

An optional step in one embodiment, is to generate a first portion of a video media stream that comprises an I-frame portion of compressed video and a second portion of the video media stream that comprises at least one of a P-frame portion and a B-frame portion of compressed video (324) wherein the P-frame portion and B-frame portion includes video information that is based upon the I-frame portion of the compressed video. The method also optionally includes encrypted at least one of the first portion and the second portion of the streamed video media stream (328).

Thereafter, the method includes transmitting the first portion of the streamed video media stream over the first communication channel according to the first communication protocol (332) and transmitting the second portion of the video media stream over the second communication channel according to a second communication protocol (336). The first and second communication channels support communications according to one of a cellular communication protocol, a WiMax wireless protocol, a Bluetooth wireless protocol, an I.E.E.E. 802.11 based wireless protocol, or an infrared wireless communication protocol. In this embodiment, neither the first nor the second portions are encrypted. Rather, the diversity in transmission protocol is used to provide the secure for delivery of the video media stream.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences.

As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Moreover, the term "operable to" requires a device to include logic, circuitry, or computer instructions stored in memory or other structure that facilitates the functionality associated with such language. As one of ordinary skill in the art will also appreciate, inferred coupling (i.e., where one element is coupled to another element by inference) includes direct and indirect coupling between two elements in the same manner as "operably coupled".

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. A method in a wireless device to receive streamed video from a media source comprising:
   establishing a secure first communication pathway between the wireless device and the media source, in which the secure first communication pathway uses a first communication protocol;
   interacting with the media source via the secure first communication pathway to exchange encryption parameters to establish an encryption key for use between the wireless device and the media source, and to setup a media delivery session over a second communication pathway that uses a second communication protocol, the second communication pathway including a first wireless channel and a differing second wireless channel;
   receiving streamed video from the media source at the wireless device over the second communication pathway during the delivery session, wherein the streamed video, prior to transmission, is separated into an encrypted first portion and an unencrypted second portion and transmitted as separate first and second portions, the encrypted first portion is received via the first wireless channel, and the unencrypted second portion is received via the differing second wireless channel, the first wireless channel and the second wireless channel serviced according to a common communication protocol standard; and
   decrypting the encrypted first portion of the streamed video with the encryption key at the wireless device and combining the decrypted first portion and the unencrypted second portion to recover video content transmitted from the media source in the video stream.

2. The method of claim 1, wherein the encryption key includes a public portion and a private portion.

3. The method of claim 1, wherein the first communication pathway is a wired communication pathway and the second communication pathway is a wireless pathway.

4. The method of claim 1, wherein the first communication pathway is a wireless communication pathway and the second communication pathway is also a wireless pathway.

5. The method of claim 4 wherein the second communication pathway according to one of a WiMax wireless protocol, an I.E.E.E. 802.11 based wireless protocol, a Bluetooth wireless protocol, or an infrared wireless communication protocol.

6. The method of claim 1, wherein the first communication pathway is discontinued before the second communication pathway is established.

7. The method of claim 1, wherein data for the streamed video is delivered on the first wireless channel of the second communication pathway and one of control data or meta data for the streamed video is delivered on the second wireless channel of the second communication pathway.

8. The method of claim 1, wherein the first wireless channel comprises a first I.E.E.E. 802.11 channel and the second wireless channel comprises a second I.E.E.E. 802.11 channel.

9. The method of claim 1, wherein the encrypted first portion of the streamed video comprises an encrypted I-frame portion of compressed video and the unencrypted second portion of the streamed video comprises at least one of a P-frame portion and a B-frame portion of the compressed video.

10. The method of claim 1, wherein to exchange encryption parameters to establish the encryption key includes receiving the encryption key parameters from the media source.

11. The method of claim 1, wherein to exchange encryption parameters to establish the encryption key includes transmitting the encryption key parameters to the media source.

12. The method of claim 1, wherein to exchange encryption parameters to establish the encryption key includes engaging in a key exchange to replace an original key with a new encryption key.

13. The method of claim 1, wherein to exchange encryption parameters to establish the encryption key includes engaging in a pairing procedure between the wireless device and the media source.

14. A method in a wireless device to receive streamed video from a media source comprising:
establishing a first communication pathway between the wireless device and the media source, in which the first communication pathway uses a first communication protocol and in which the first communication pathway is a secure communication pathway, wherein the wireless device wirelessly links to the media source via the first communication pathway;
interacting with the media source via the first communication pathway to exchange encryption parameters to establish an encryption key for use between the wireless device and the media source, and to setup a media delivery session over a second communication pathway that uses a second communication protocol, the second communication pathway including a first wireless channel and a differing second wireless channel;
receiving streamed video from the media source at the wireless device over the second communication pathway during the delivery session, wherein the streamed video, prior to transmission, is separated into an encrypted first portion and an unencrypted second portion and transmitted as separate first and second portions, the encrypted first portion is received via the first wireless channel, and the unencrypted second portion is received via the differing second wireless channel, the first wireless channel and the second wireless channel serviced according to a common communication protocol standard; and
decrypting the encrypted first portion of the streamed video with the encryption key at the wireless device and combining the decrypted first portion and the unencrypted second portion at the wireless device to recover video content transmitted from the media source in the video stream.

15. The method of claim 14, wherein the encryption key includes a public portion and a private portion.

16. The method of claim 14, wherein to exchange encryption parameters to establish the encryption key includes engaging in a pairing procedure between the wireless device and the media source.

17. The method of claim 14, wherein data for the streamed video is delivered on the first wireless channel of the second communication pathway and one of control data or meta data for the streamed video is delivered on the second wireless channel of the second communication pathway.

18. The method of claim 14, wherein the first wireless channel comprises a first I.E.E.E. 802.11 channel and the second wireless channel comprises a second I.E.E.E. 802.11 channel.

19. The method of claim 14, wherein the encrypted first portion of the streamed video comprises an encrypted I-frame portion of compressed video and the unencrypted second portion of the streamed video comprises at least one of a P-frame portion and a B-frame portion of the compressed video.

20. An apparatus to receive streamed video from a media source comprising:
a first transceiver circuitry to establish a first communication pathway between the first transceiver circuitry and the media source, in which the first transceiver circuitry to use a first communication protocol to communicate when using the first communication pathway and in which the first communication pathway is a secure communication pathway;
a second transceiver circuitry to establish a second communication pathway between the second transceiver circuitry and the media source, in which the second communication pathway, the second communication pathway including a first wireless channel and a differing second wireless channel;
a processor coupled to the first and second transceiver circuitry to interact with the media source via the first communication pathway to exchange encryption parameters to establish an encryption key for use between the apparatus and the media source, and subsequently to setup a media delivery session between the apparatus and the media source via the second communication pathway, wherein the second transceiver circuitry to receive streamed video from the media source via the second communication pathway during the delivery session, in which the streamed video, prior to transmission, is separated into an encrypted first portion and an unencrypted second portion and transmitted as separate first and second portions, the encrypted first portion is received via the first wireless channel, and the unencrypted second portion is received via the differing second wireless channel, the first wireless channel and the second wireless channel serviced according to a common communication protocol standard; and
wherein the processor to decrypt the encrypted first portion of the streamed video with the encryption key and to combine the decrypted first portion and the unencrypted second portion to recover video content transmitted from the media source in the video stream.

21. The apparatus of claim 20, wherein the first transceiver circuitry to use a wired connection to link to the first communication pathway and the second transceiver circuitry to wirelessly link to the second communication pathway.

22. The apparatus of claim 20, wherein the first transceiver circuitry to wirelessly link to the first communication pathway and the second transceiver circuitry to wirelessly link to the second communication pathway.

23. The apparatus of claim 20, wherein the encryption key includes a public portion and a private portion.

24. The apparatus of claim 20, wherein the processor to engage in a pairing procedure with the media source to exchange encryption parameters to establish the encryption key.

25. The apparatus of claim 20, wherein data for the streamed video is delivered on the first wireless channel of the second communication pathway and one of control data or meta data for the streamed video is delivered on the second wireless channel of the second communication pathway.

26. The apparatus of claim 20, wherein the first wireless channel comprises a first I.E.E.E. 802.11 channel and the second wireless channel comprises a second I.E.E.E. 802.11 channel.

27. The apparatus of claim 20, wherein the encrypted first portion of the streamed video comprises an encrypted I-frame portion of compressed video and the unencrypted second portion of the streamed video comprises at least one of a P-frame portion and a B-frame portion of the compressed video.

28. The apparatus of claim 20, wherein the apparatus is a handheld device.

29. The apparatus of claim 20, wherein the first communication pathway is a cellular communication pathway.

30. The apparatus of claim 20, wherein the first communication pathway is a telephone communication pathway.

* * * * *